United States Patent [19]

Luque

[11] 4,450,325

[45] May 22, 1984

[54] ELECTRO-MECHANICAL HAND CONTROLLER

[76] Inventor: Tom R. Luque, 22000 Romar St., Chatsworth, Calif. 91311

[21] Appl. No.: 480,777

[22] Filed: Apr. 6, 1983

Related U.S. Application Data

[63] Continuation of Ser. No. 275,595, Oct. 8, 1981, abandoned.

[51] Int. Cl.³ .................. H01H 25/00; H01H 29/00; H01H 35/00; H01H 9/00
[52] U.S. Cl. .............................. 200/52 R; 200/6 A; 200/61.52; 200/157; 200/182; 200/220; 200/224
[58] Field of Search ............... 200/6 A, 61.47, 61.52, 200/187, 220, 157, 32 R, 224, 182, 185

[56] References Cited

U.S. PATENT DOCUMENTS

| | | | |
|---|---|---|---|
| 2,752,463 | 6/1956 | Staak | 200/157 X |
| 2,757,749 | 8/1956 | Cooper et al. | 200/220 X |
| 2,782,276 | 2/1957 | Woods | 200/61.47 |
| 2,841,659 | 7/1958 | Eitel | 200/6 A X |
| 3,018,750 | 1/1962 | Hill | 200/157 X |
| 3,035,132 | 5/1962 | Gorike et al. | 200/61.47 |
| 3,259,202 | 7/1966 | Griffeth | 200/61.52 X |
| 3,299,389 | 1/1967 | Vercesi et al. | 338/309 |
| 3,371,171 | 2/1968 | Gregory | 200/61.47 X |
| 3,707,093 | 12/1972 | Worden | 200/6 A X |
| 3,711,811 | 1/1973 | Oka et al. | 338/128 |
| 3,946,359 | 3/1976 | Henderson | 200/61.47 X |
| 4,107,642 | 8/1978 | Crummett | 338/128 |

Primary Examiner—J. R. Scott

[57] ABSTRACT

An inclination sensitive hand controller comprises a generally cylindrical handle having liquid contact switches mounted at different angles of orientation within the handle. The switches are actuated dependent upon the tilting of the handle from a preselected position. A squeeze responsive control switch is mounted in a non-exposed position within the handle. This switch is activated or deactivated upon squeezing of the handle to control connection and disconnection of electrical power to the tilt switches. An exposed finger-depressible switch is mounted at one end of the handle which independently controls other circuits than the circuits controlled by the tilt switches and the squeeze responsive control switch.

10 Claims, 5 Drawing Figures

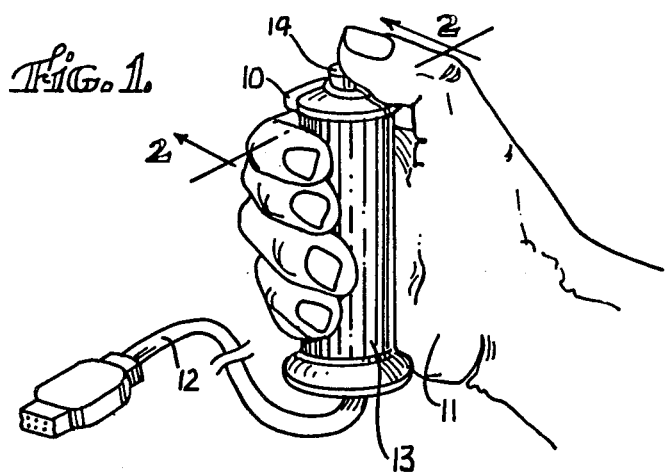
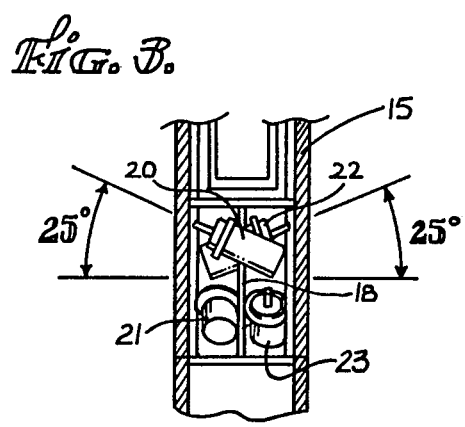
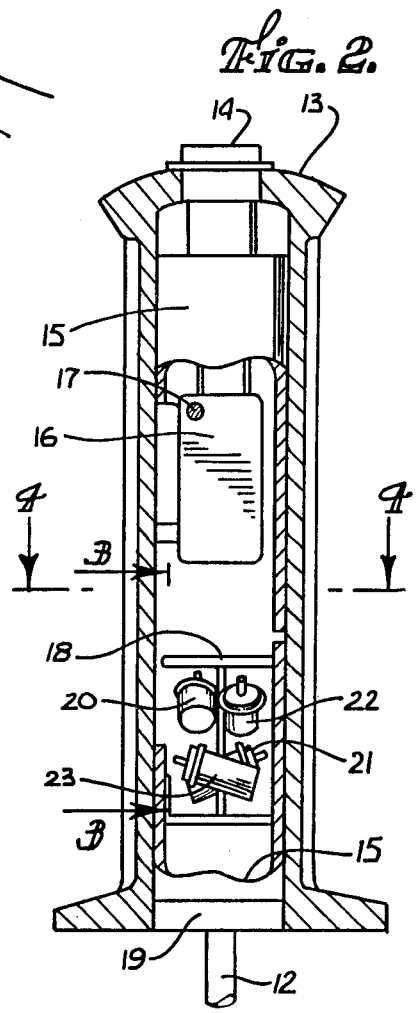
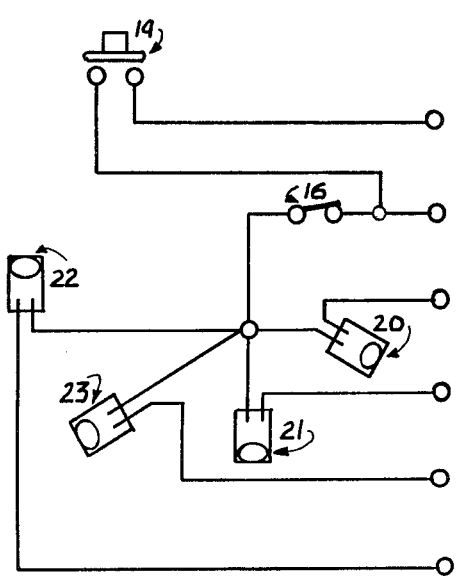
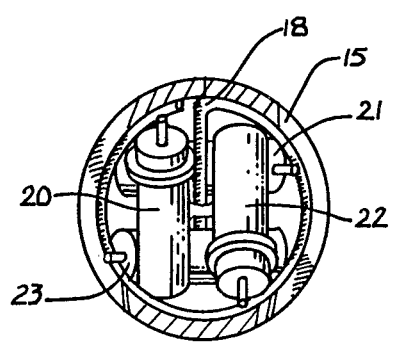

ELECTRO-MECHANICAL HAND CONTROLLER

This application is a continuation of application Ser. No. 275,595, filed Oct 8, 1981, now abandoned.

BACKGROUND OF THE INVENTION

This control handle is a unique improvement over all other prior art.

A control handle is capable of simultaneously controlling a plurality of switches mounted within said handle. A combination of switch closures will be interpreted by a control signal receiver. The control signal receiver is of known construction and does not form part of the present invention.

The control handle does not need to be oriented to any fixed object for stability of operation, and is ambidextrous by nature of design layout. Only one hand of an operator is necessary for full operation of the control handle.

The switches are of the type which use electrically conductive liquid within the switch. The use of sealed tilt switches makes the control handle safe to use in an explosive atmosphere. These switches are low cost, long life, and sealed against the environment, which increases their useful life as compared to other types of electro-mechanical switches and potentiometers. The control handle takes advantage of the electronics in a control signal receiver, thus eliminating the need to incorporate variable resistance devices that translate positional information which are more costly and of lower life cycle. The plurality of tilt switches in the handle provides more flexibility and added efficiency by matching the psychomotor coordination of the operator to the type and nature of signal control receiver being used. By variation of the basic design, the control handle can be adapted to many types of radio controlled devices, computer controls, video games, industrial controls, and by people who have restricted mobility.

BRIEF DESCRIPTION OF THE DRAWINGS

FIG. 1 is a perspective view of the hand controller positioned properly in operator's hand.

FIG. 2 is a sectional view taken along line 2—2 of FIG. 1.

FIG. 3 is a sectional view taken along line 3—3 of FIG. 2, which is the heart of my invention.

FIG. 4 is a sectional view taken along line 4—4 of FIG. 2.

FIG. 5 is an electrical layout of one type.

DESCRIPTION OF THE PREFERRED EMBODIMENT

FIG. 1 illustrates the improved hand controller 13 according to the present invention. The handle is held with one hand by an operator 11 and is connected to a control signal receiver by a control cable 12. The control signal receiver is of known construction and does not form part of the present invention and is not shown. The control handle 13 also has a push button switch 14 that can be actuated by the operator's thumb which provides commands to the signal receiver for other purposes.

The forward orientation is referenced by the appendage 10 on the handle.

FIG. 2 illustrates a push button switch 14 mounted in handle 13 which is compressible. Inserted in handle which has a generally cylindrical shape is a casing 15 which houses a side sensing grip switch 16 which is held in place by a rod 17 so that the grip switch can pivot freely on the rod's axis when the operator squeezes the control handle to activate the grip switch. A tilt switch assembly is mounted to a wire loom 18 in the casing 15.

Cable 12 is secured into the bottom of handle 13 through a cable strain relief 19 that fits into the casing 15.

FIGS. 2, 3, and 4 designate the vertical position of the tilt switch assembly loom 18. All tilt switches are adjusted to a specified tilt angle that is best suited for a particular application. Tilting or angular displacement of the handle from a normal vertical orientation, generally toward one of four horizontal, orthogonal directions will activate a respective one of or a combination of the four switches 20,21,22, or 23 which are securely supported from a loom 18 within the handle. A combination of eight directional signals can be translated by a control signal receiver. Switch 23 is mounted at a right angle to switch 22 which is mounted at a right angle to switch 21 which is mounted at a right angle to switch 20.

FIG. 5 designates one electrical layout. Tilting of handle 13 from a vertical position will provide one of eight positional signals to a control signal receiver by closing the electrical contacts in one or two of the tilt switches. By changing the tilt orientation of one or more tilt switches (a twenty-five degree tilt angle being illustrated in FIG. 3 by way of example) and adding passive components, the control switch assembly can easily interface with other types of control signal receivers. A switch 16 can be wired as a DEAD-MAN SWITCH to stop positional information fed into a signal receiver if the operator drops the control handle. Or switch 16 can be wired as an INHIBIT SWITCH as illustrated. The operator would squeeze the handle to disable information being sent to receiver.

What is claimed is:

1. An inclination sensitive control handle, comprising:
    a generally cylindrical handle controllable by an operator by tilting of said handle from a preselected position, said handle being at least slightly compressible radially inwardly in response to manual squeezing thereof;
    a plurality of tilt switches mounted within said handle, each of said tilt switches being oriented for actuation or deactuation upon tilting of said handle away from said preselected position; and
    a squeeze responsive control switch in a nonexposed position within said handle for controllably connecting and disconnecting supply of electrical power to said tilt switches in response to squeezing of said handle.

2. The inclination sensitive control handle of claim 1 further including a finger-depressible switch mounted generally at one end of said handle.

3. An inclination sensitive control handle, comprising:
    a generally cylindrical handle controllable by an operator by tilting of said handle from a vertical position, said handle being at least slightly compressible radially inwardly in response to manual squeezing thereof;
    a first tilt switch mounted within said handle for activation upon tilting of said handle generally toward one of four horizontal, orthogonal directions;

a second tilt switch mounted within said handle for activation upon tilting of said handle generally toward the second of said directions;

a third tilt switch mounted within said handle for activation upon tilting of said handle generally toward the third of said directions;

a fourth tilt switch mounted within said handle for activation upon tilting of said handle generally toward the fourth of said directions; and a squeeze responsive control switch in a nonexposed position within said handle and responsive to squeezing of said handle for controlling connection and disconnection of electrical power to said tilt switches.

4. The inclination sensitive control handle of claim 3 wherein said tilt switches are securely mounted within said handle at respective preselected angles relative to a vertical axis.

5. The inclination sensitive control handle of claim 4 wherein said first and third tilt switches are disposed generally at a right angle relative to said second and fourth tilt switches.

6. The inclination sensitive control handle of claim 3 wherein said squeeze responsive control switch is responsive to squeezing of said handle to connect electrical power to said tilt switches.

7. The inclination sensitive control handle of claim 3 wherein said squeeze responsive control switch is responsive to squeezing of said handle to disconnect electrical power to said tilt switches.

8. The inclination sensitive control handle of claim 3 further including a finger-depressible switch mounted generally at one end of said handle.

9. An inclination sensitive control handle, comprising:

a generally cylindrical handle controllable by an operator for tilting movement from a generally vertical orientation to a tilted position disposed angularly relative to a vertical axis, said handle being at least slightly compressible radially inwardly in response to manual squeezing thereof;

at least three tilt responsive switches mounted within said handle for actuation and deactuation in response to tilting movement of said handle; and a squeeze responsive control switch in a nonexposed position within said handle and responsive to squeezing of said handle for controlling connection and disconnection of electrical power to said tilt switches.

10. The inclination sensitive control handle of claim 9 further including a finger-depressible switch mounted generally at one end of said handle.

* * * * *